US005894535A

United States Patent [19]
Lemoff et al.

[11] Patent Number: 5,894,535
[45] Date of Patent: Apr. 13, 1999

[54] OPTICAL WAVEGUIDE DEVICE FOR WAVELENGTH DEMULTIPLEXING AND WAVEGUIDE CROSSING

[75] Inventors: Brian E. Lemoff, Mountain View; Lewis B. Aronson, Los Altos, both of Calif.

[73] Assignee: Hewlett-Packard Company, Palo Alto, Calif.

[21] Appl. No.: 08/852,368

[22] Filed: May 7, 1997

[51] Int. Cl.$^6$ ................................................. G02B 6/26
[52] U.S. Cl. ........................... 385/47; 385/14; 385/43
[58] Field of Search .............................. 385/33, 36, 38, 385/42, 43, 44, 45, 46, 47, 14

[56] References Cited

U.S. PATENT DOCUMENTS

| | | | |
|---|---|---|---|
| 3,870,398 | 3/1975 | Love | 385/47 |
| 3,874,779 | 4/1975 | Thiel | 385/47 |
| 4,747,653 | 5/1988 | Kahn | 350/96.15 |
| 4,790,615 | 12/1988 | Seki et al. | 350/96.12 |
| 5,253,319 | 10/1993 | Bhagavatula | 385/14 |
| 5,650,123 | 7/1997 | Saini et al. | 385/47 |

OTHER PUBLICATIONS

M. Seki, R. Sugawara and Y. Hanada, "Novel Design for a High Performance Guided–Wave Multi/Demultiplexer in Glass", Journal of Modern Optics, 1989, vol. 36, No. 6, pp. 797–808.

M. Kawachi, Y. Yamada, M. Yasu, & M. Kobayashi, "Guided–Wave Optical Wavelength–Division Multi/Demultiplexer Using High–Silica Channel Waveguides", Electronics Letters, Apr. 11, 1985, vol. 21, No. 8, pp. 313–314.

*Primary Examiner*—Hung N. Ngo
*Attorney, Agent, or Firm*—Thomas X. Li

[57] ABSTRACT

A zigzag waveguide device is described that includes at least two optical waveguides converged at a vertex to form a waveguide overlap region. Optical loss in the waveguide overlap region is minimized by including a narrow gap of lower refractive index between the overlap region and each waveguide. This technique is also applied to minimize loss in a region where two optical waveguides cross one another. A mirror or optical filter reflectively couples the two waveguides at the vertex. When the coupling is provided by an optical filter, some range of wavelengths is transmitted out of the zigzag waveguide device, rather than reflected. The transmitted light may be collected by an output waveguide which is wider than the waveguides to minimize loss due to divergence. Light exiting the device may be coupled directly to a photodetector with no intervening optical fiber. In addition, the width of an input waveguide of the zigzag waveguide device is tapered to reduce angular spread of the light in the zigzag device.

18 Claims, 11 Drawing Sheets

OPTICAL WAVEGUIDE DEVICE FOR WAVELENGTH DEMULTIPLEXING AND WAVEGUIDE CROSSING

BACKGROUND OF THE INVENTION

1. Field of the Invention

The present invention pertains to optical communications. More particularly, this invention relates to an optical waveguide apparatus with various improvements.

2. Description of the Related Art

As is known, wavelength division multiplexing (WDM) introduces a new way of increasing the capacity of fiber optic communications links. In a WDM system, several independent optical signals, each having a different optical wavelength, are transmitted through a single optical fiber (either single mode or multimode) from the transmitting end of the system. At the receiving end of the WDM system, the different wavelength optical signals are detected and separated in accordance with their wavelengths. Many different techniques have been developed to achieve this wavelength separation. These techniques can be referred to as either bulk optics or integrated optics. In a bulk optical system, light from an optical fiber is first collimated by a lens. The collimated light is then separated into its constituent wavelengths using diffraction gratings, dielectric filters, or prisms. The separated beams are then focused by lenses either onto separate detectors or into separate optical fibers. The optical fibers used in a bulk optical system can be either multimode or single mode optical fibers. Bulk optical systems can be made with low insertion loss and low crosstalk interference.

Disadvantages are, however, associated with the bulk optical systems. One disadvantage of the bulk optical systems is that they are typically large in size. Another disadvantage associated is that the bulk optical systems often consist of expensive elements and typically require labor intensive alignment.

In some prior art integrated optical systems, an optical fiber is directly attached to a dielectric waveguide. In many such systems, a channel waveguide geometry exists which exploits interference and/or diffraction to separate different wavelength constituents into separate waveguides. These systems are only applicable to single mode fibers. In other prior art integrated optical systems, slab waveguide geometries confine the light in one dimension, while allowing the light to diverge in another dimension. Often, an integrated diffraction grating is fabricated in the same substrate as the slab waveguide, to provide the wavelength separation. Such devices are often difficult to fabricate, and typically have a high insertion loss.

Figure 1:
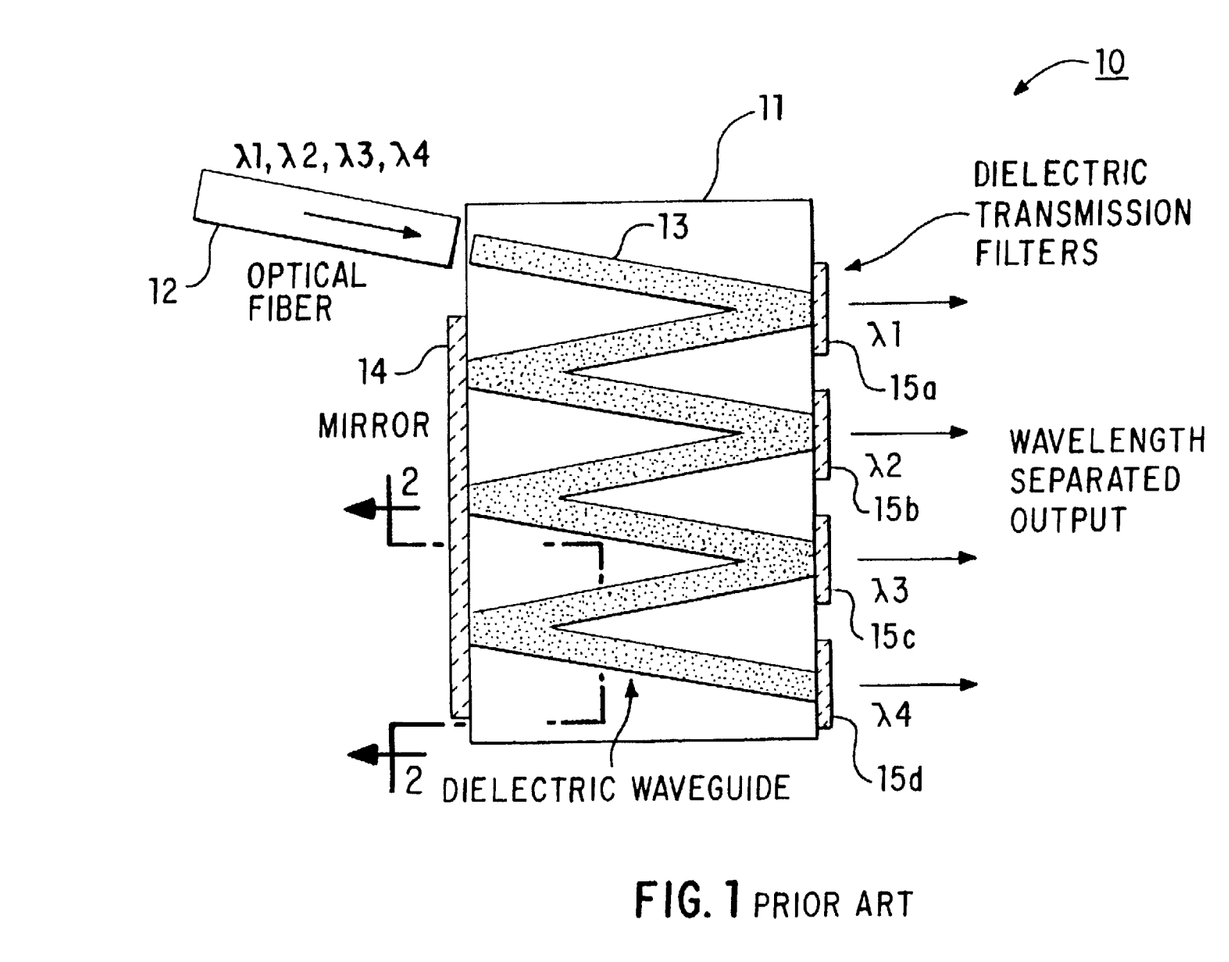
FIG. 1 shows a prior art zigzag optical waveguide demultiplexer.

One prior solution to solving the above-mentioned problems is shown in FIG. 1. FIG. 1 shows a prior art zigzag patterned dielectric waveguide demultiplexer 10 that separately detects and extracts the optical signals of different wavelengths. In this demultiplexer 10, light containing several constituent wavelengths (e.g., $\lambda_1, \lambda_2, \lambda_3, \lambda_4$) is coupled directly from an external optical fiber 12 into a dielectric channel waveguide structure 13 of the demultiplexer 10. The structure 13 has a zigzag geometry with dielectric interference filters (e.g., 15a, 15b, 15c, or 15d) or broad-band mirrors (e.g., mirror 14) attached to each vertex of the structure 13.

The zigzag waveguide demultiplexer can be used with either single mode or multimode optical fiber inputs. In addition, it has most of the advantages that the integrated optical wavelength demultiplexers have. This means that, with the exception of the filters and mirrors, a zigzag waveguide demultiplexer is monolithic and can be fabricated by batch process.

Figure 2:
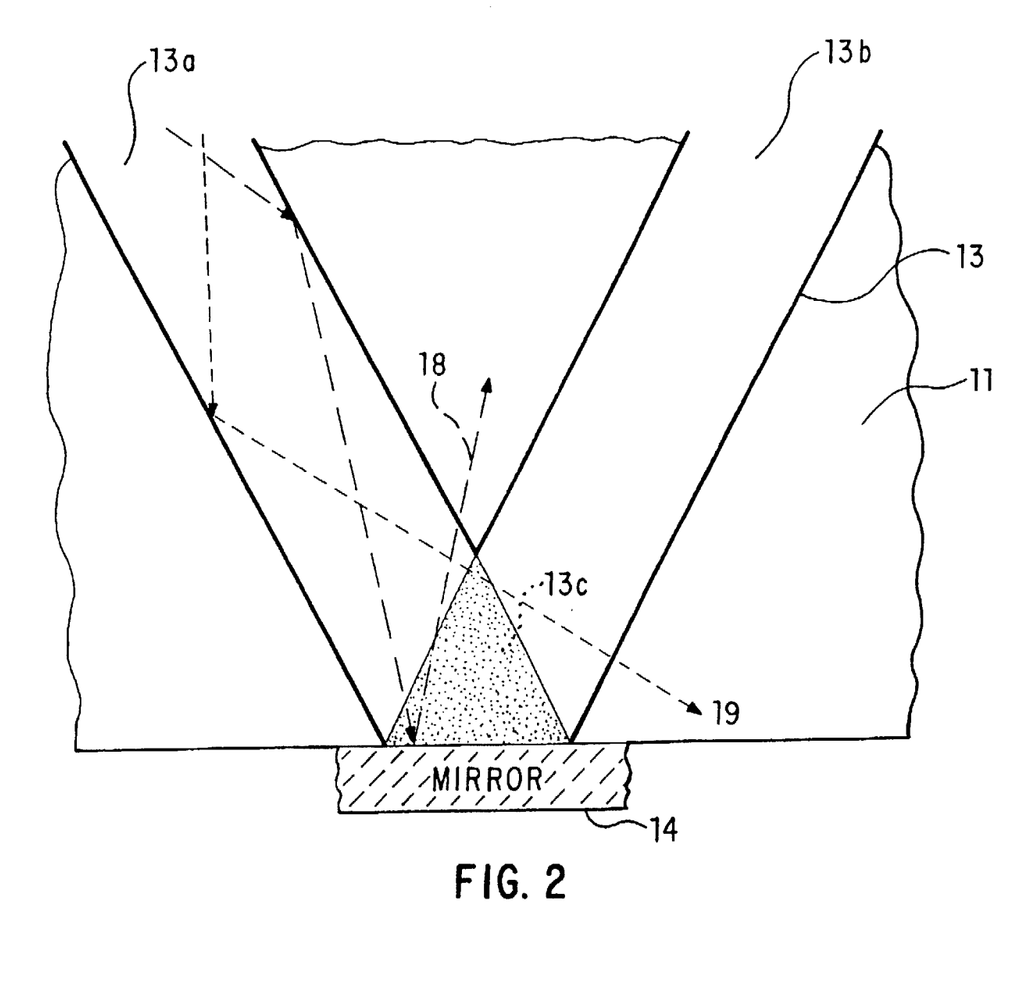
FIG. 2 shows a portion of the zigzag optical demultiplexer of FIG. 1 along line 2—2.

One problem of such a prior art zigzag waveguide demultiplexer is that a significant optical loss in the device occurs in the region near the mirror or optical filter vertex where two angled waveguides converge. This effect is shown in FIG. 2. As can be seen from FIG. 2, as light enters the overlap region (i.e., the shaded triangle region 13c) between the input and output waveguides 13a and 13b of the structure 13, the light is no longer confined to the width of a single waveguide. Because the light contains rays of many angles (determined by the critical angle of the core/cladding index difference), divergence occurs in this region 13c. As a result, some fraction of the light is not collected in the output waveguide 13b. FIG. 2 shows two rays (i.e., light rays 18 and 19) which are not collected by the output waveguide 13b. This effect is most pronounced in highly multimode waveguide devices where the Rayleigh range is shorter than the waveguide width.

SUMMARY OF THE INVENTION

One of the features of the present invention is to provide a compact and cost effective optical demultiplexer for fiber optic communications, whether single-mode or multimode fiber is used.

Another feature of the present invention is to minimize optical loss in waveguide devices due to divergence of light in regions where two non-parallel waveguides overlap.

Another feature of the present invention is to improve the wavelength selectivity of optical filters used in an optical wavelength demultiplexer by reducing the divergence of the light incident on the optical filters.

A further feature of the present invention is to allow light exiting an optical wavelength demultiplexer to couple directly to a photodetector without any intervening optical fiber.

Described below is a reflectively coupled optical waveguide structure that includes at least a first and a second waveguide converged at a vertex to form an overlapping waveguide region. At the vertex, a reflective surface couples light from the first waveguide to the second waveguide. The first and second waveguides and the overlapping waveguide region have the same refractive index. A first gap is provided between the overlapping waveguide region and the first waveguide and a second gap is provided between the overlapping waveguide region and the second waveguide. The gaps have a refractive index lower than that of the first and second waveguides and the overlapping waveguide region to minimize divergence loss of light due to the overlapping waveguide region.

This concept can also be applied to a planar optical waveguide device having two waveguides intersecting one another. The intersecting waveguides have a crossover waveguide region. Each side of the crossover waveguide region is then separated from remaining portions of the first and second waveguides by a gap having a refractive index lower than that of the waveguides and the crossover waveguide region to minimize divergence loss of light due to the crossover waveguide region.

In accordance with another aspect of the present invention, a zigzag optical apparatus can have a first waveguide whose width is tapered from a smaller value at the optical input end to a larger value at the optical output end, thus reducing the divergence of the light at the optical output end. Moreover, a zigzag optical apparatus is described that is fabricated from a polymer material.

Other features and advantages of the present invention will become apparent from the following detailed description, taken in conjunction with the accompanying drawings, illustrating by way of example the principles of the invention.

DETAILED DESCRIPTION OF THE INVENTION

Figure 3:
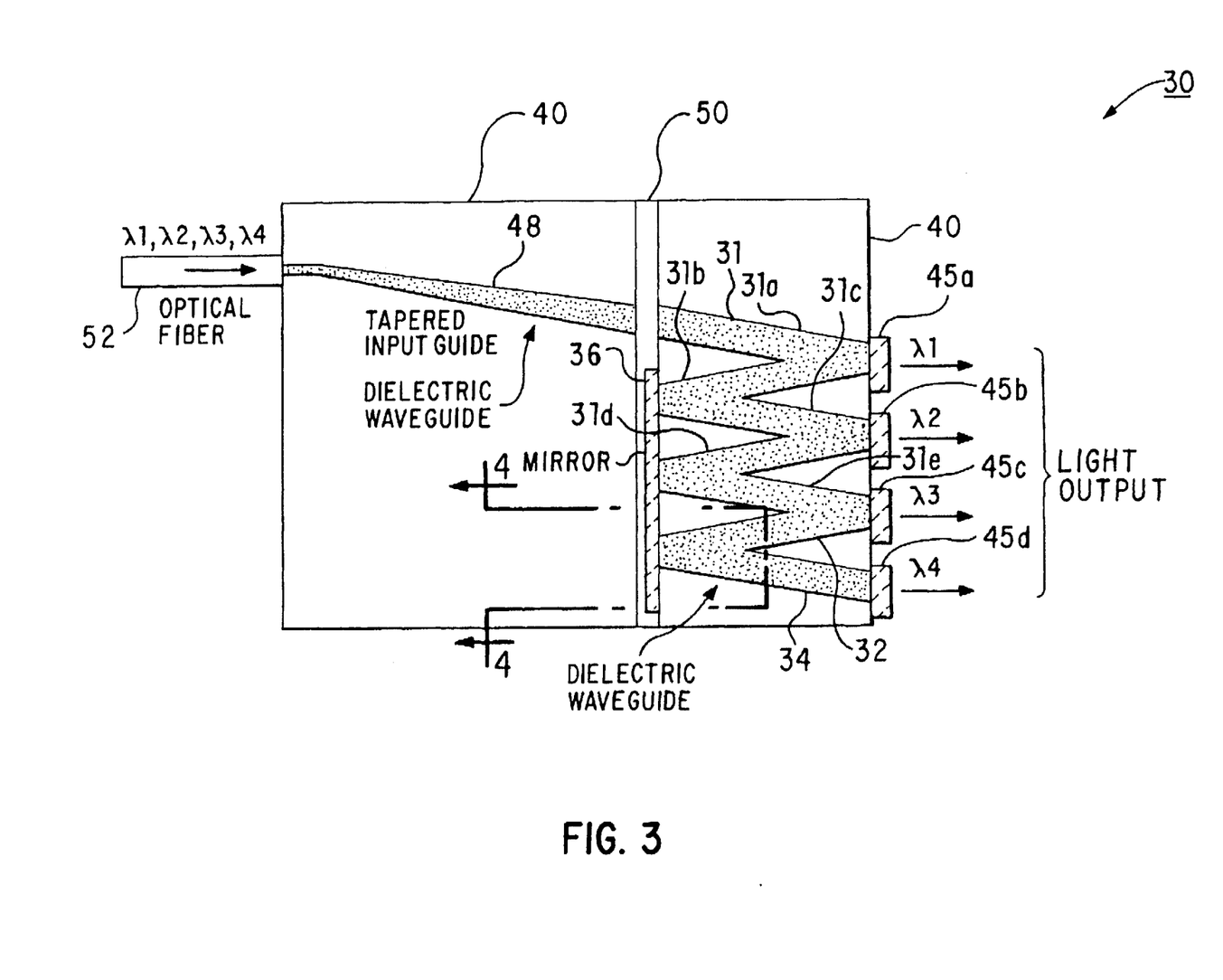
FIG. 3 shows a zigzag optical waveguide demultiplexer in accordance with embodiments of the present invention.

FIG. 3 shows a dielectric optical waveguide demultiplexer 30 that implements embodiments of the present invention. The demultiplexer 30 of FIG. 3 can be referred to as a reflectively coupled optical waveguide structure or device. The demultiplexer 30 can also be referred to as a zigzag waveguide demultiplexer because it has a zigzag patterned dielectric waveguide structure 31 embedded in a substrate 40.

A zigzag waveguide demultiplexer can be defined as a planar optical device that includes two or more optical channel waveguides oriented such that two adjacent waveguides converge at a vertex. At each vertex of the waveguide structure 31, either a reflective mirror (e.g., the mirror 36) is used to reflect light from one waveguide into the subsequent waveguide, or an optical filter (e.g., the optical filter 45a, 45b, 45c, or 45d) is used to transmit light in a particular wavelength range out of the waveguide structure 31 while reflecting light in other wavelength range into the subsequent waveguide, thus accomplishing the optical demultiplexing function.

In one embodiment, each vertex of the zigzag waveguide structure 31 has a vertex angle of approximately 12°. In other embodiments, the vertex angle can be greater or less than 12°. For example, the vertex angle can be in a range of 3° to 45°.

The zigzag waveguide structure 31 is formed by a number of dielectric channel waveguides 31a–31e, 32, and 34. These waveguides 31a–31e, 32, and 34 are dielectric layers embedded in a cladding region. The cladding region can be a dielectric layer on the substrate 40. The cladding region can also be the substrate 40 itself. The cladding region has a cladding refractive index. The dielectric channel waveguides 31a–31e, 32, and 34 have another refractive index which is referred to as the core refractive index. The core refractive index is higher than the cladding refractive index such that light travels within the waveguides 31a–31e, 32, and 34. The difference between the core and cladding refractive indices determines the critical angle of light within the waveguides 31a–31e, 32, and 34. The waveguide structure 31 is embedded in the substrate 40 using known means and methods.

In one embodiment, each waveguide of the zigzag waveguide structure 31 is substantially rectangular in cross section and is approximately 70 microns high by 100 microns wide. Alternatively, other dimensions and shapes can be used for the waveguide structure 31.

In one embodiment, the substrate 40 is made of a low refractive index polymer material and the waveguide structure 31 is made of a high refractive index polymer material. This enables cost-effective fabrication and a high degree of mechanical compliance. Alternatively, other dielectric materials may be used. For example, glass can be used to form the waveguide structure 31.

As can be seen from FIG. 3, light containing several constituent wavelengths (e.g., $\lambda_1$, $\lambda_2$, $\lambda_3$, and $\lambda_4$) is coupled directly from an external optical fiber 52 into a dielectric channel input waveguide 48 of the demultiplexer 30. The input waveguide 48 then couples the light into the zigzag waveguide structure 31. An optical filter (e.g., the optical filter 45a, 45b, 45c, or 45d) is placed at a vertex of the waveguide structure 31 to transmit light of a particular wavelength out of the demultiplexer 30 and to reflect light of other wavelengths into a subsequent waveguide of the waveguide structure 31.

In one embodiment, the demultiplexer 30 has an optical filter at each vertex of the waveguide structure 31. In another embodiment and as shown in FIG. 3, the vertices of the waveguide structure 31 at the light input side of the waveguide structure 31 are coupled with reflective mirrors and each vertex of the waveguide structure 31 at the light output side of the waveguide structure 31 is coupled to an optical filter (i.e., the optical filter 45a, 45b, 45c, or 45d) of a particular wavelength.

Figure 11:
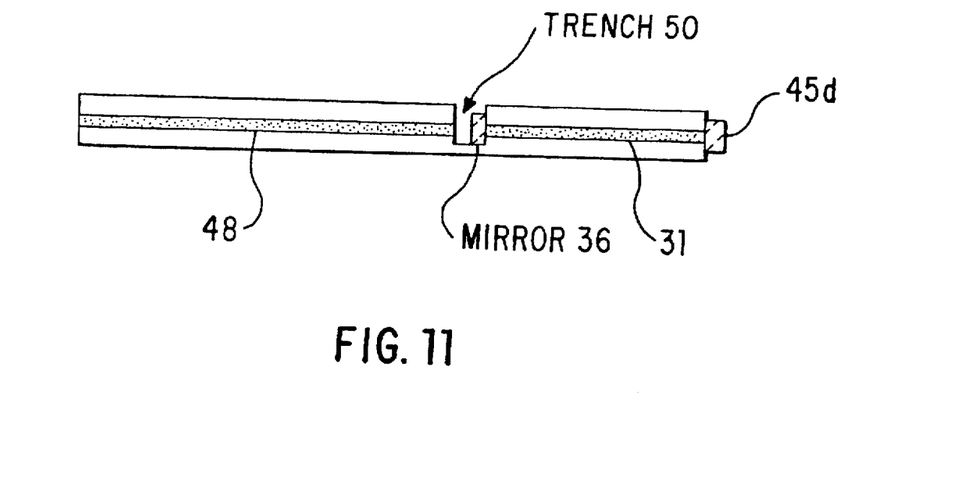
FIG. 11 is a side view the zigzag waveguide demultiplexer of FIG. 3, showing a trench in the substrate of the demultiplexer in accordance with one embodiment of the present invention.

In one embodiment and as shown in FIG. 3, the input waveguide 48 is embedded in the substrate 40. In other embodiments, the input waveguide 48 may be embedded in another substrate separate from the substrate 40 in which the zigzag waveguide structure 31 is embedded. In one embodiment, the optical path of the input waveguide 48 is interrupted by a trench 50 (see also FIG. 11). In other embodiments, the optical path of the input waveguide 48 is continuous.

Figure 4:
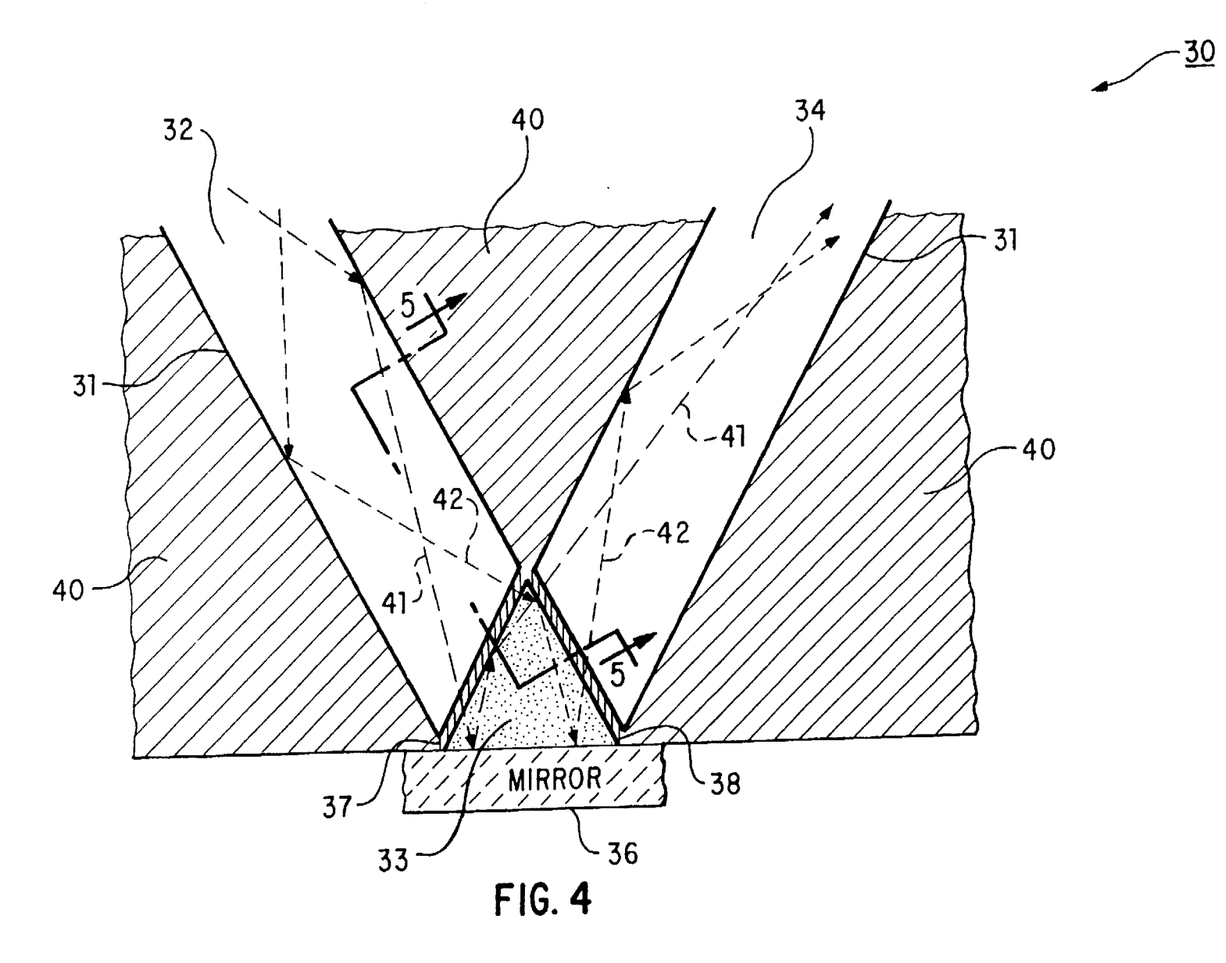
FIG. 4 shows a portion of the zigzag optical waveguide demultiplexer of FIG. 3 along line 4—4 in accordance with one embodiment of the present invention.
Figure 5:
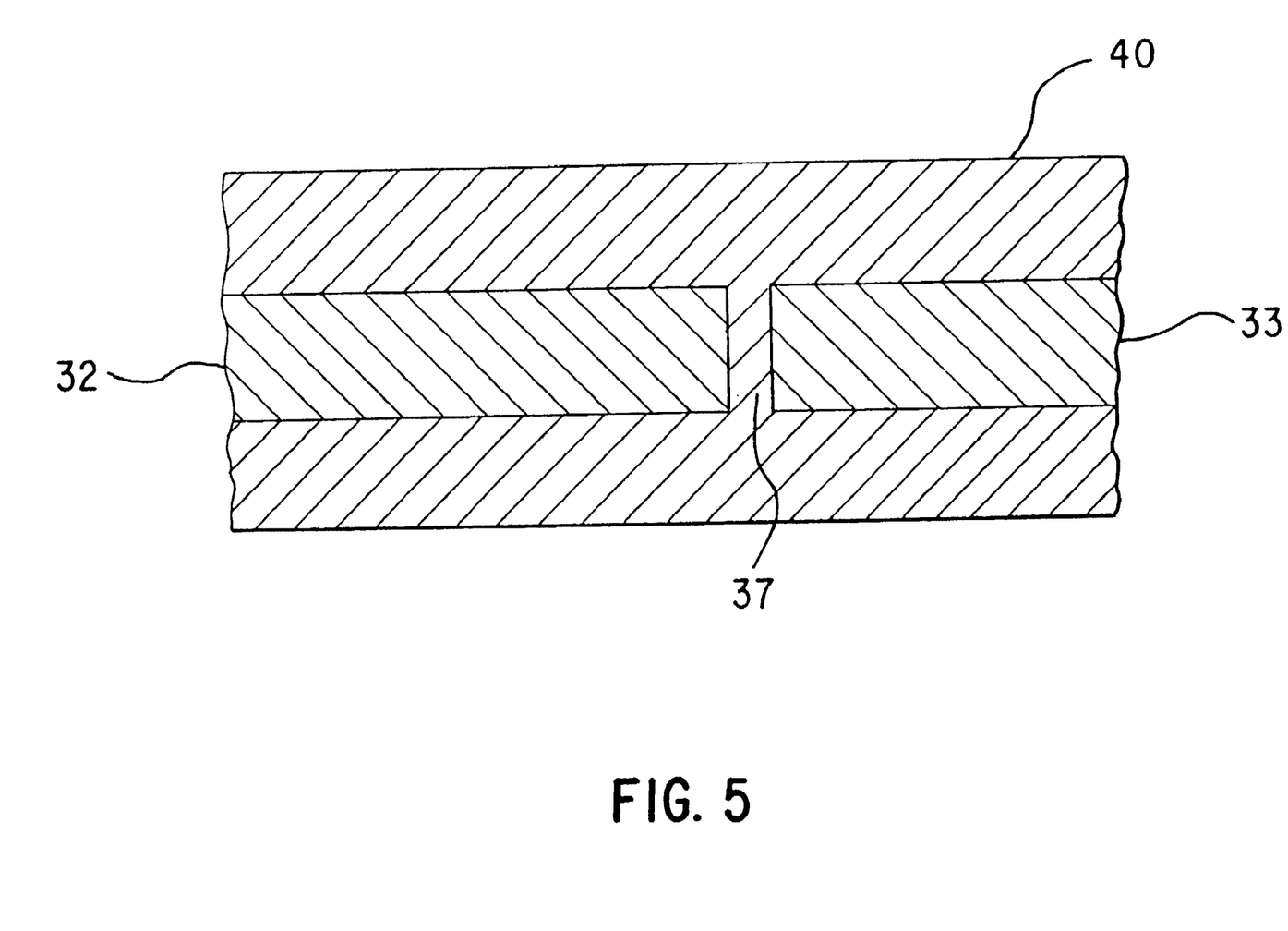
FIG. 5 is a cross sectional view of the zigzag optical waveguide demultiplexer of FIG. 4 along line 5—5.
Figure 8:
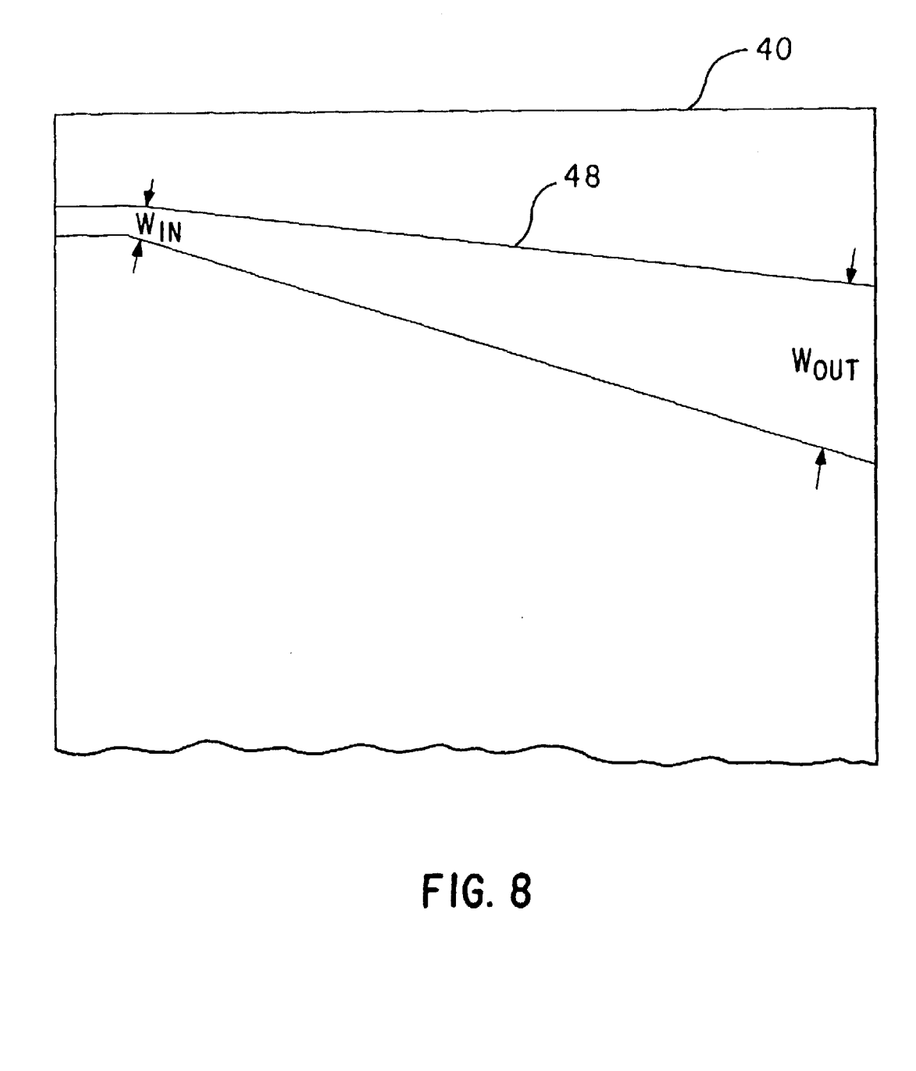
FIG. 8 shows the tapered input waveguide of the zigzag optical waveguide demultiplexer of FIG. 3 in accordance with one embodiment of the present invention.

The demultiplexer 30 can be used with either single mode or multimode optical fibers. The demultiplexer 30 is a compact and monolithic optical device that can be fabricated by batch-process. The demultiplexer 30 implements many embodiments of the present invention. FIGS. 4 and 5 show the waveguide structure 31 being segmented to reduce coupling loss at waveguide intersections in accordance with one embodiment of the present invention, which will be described in more detail below. FIG. 8 shows the input waveguide 48 of the demultiplexer 30 in a tapered shape to reduce divergence loss in accordance with one embodiment of the present invention, which will also be described in more detail below. FIGS. 11 through 16 show other embodiments of the present invention, which will be described in more detail below.

As can be seen from FIG. 4, the waveguides 32 and 34 of the zigzag waveguide structure 31 converge to form a vertex or overlapping waveguide region 33. FIG. 4 only shows a portion of the waveguide structure 31 to illustrate one embodiment of the present invention. Other portions of the waveguide structure 31 have the similar structure as shown in FIG. 4.

In FIG. 4, the vertex region 33 is a triangular waveguide region that has the same core refractive index as that of the waveguides 32 and 34. In fact, the triangular waveguide region 33 can be regarded as the overlapping region of the waveguides 32 and 34. As can be seen from FIG. 4, the vertex region 33 is separated from the waveguides 32 and 34 by two gap regions 37 and 38. FIG. 5 is a cross sectional view showing the gap region 37 between the waveguide 32 and the triangular waveguide region 33.

Figure 6:
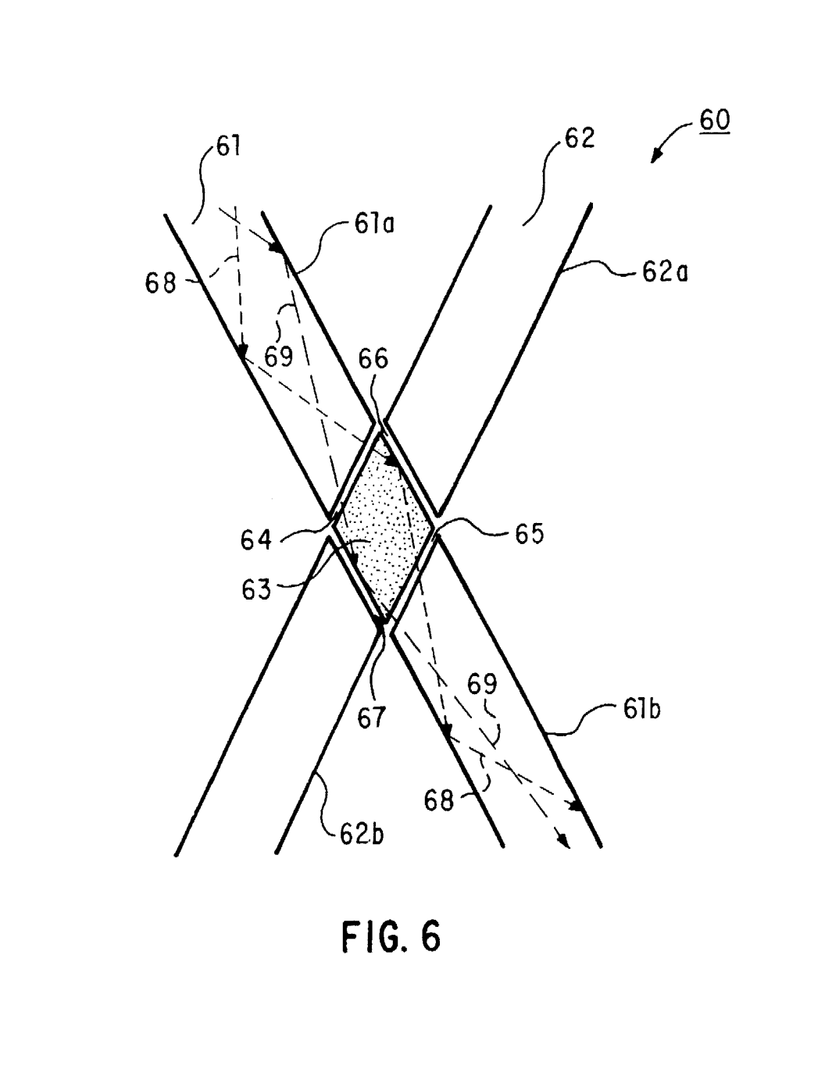
FIG. 6 shows a planar waveguide device that also implements one embodiment of the present invention.

In accordance with one embodiment of the present invention, the gap regions or gaps 37 and 38 are formed by a dielectric material having a refractive index lower than that of the waveguides 32 and 34 and the triangular waveguide region 33. The gaps 37–38 break a continuous optical path of the core refractive index from the waveguide 32 to the waveguide 34 via the triangular waveguide region 33. This causes light rays below the critical angle to still freely propagate across the gaps 37–38 with almost negligible Fresnel reflection as the rays enter and exit the triangular waveguide region 33. This also causes light rays (e.g., rays 41 and 42) that are above the critical angle when entering or exiting the triangular region 33 to be reflected by the gaps 37–38 just as the rays would have been reflected in a typical waveguide. Those rays (e.g., rays 41–42) would have been lost if there were no gaps separating the triangular waveguide region 33 from the waveguides 32 and 34 (as shown in FIG. 2). In effect, the addition of the gaps 37–38 segments the waveguides 32 and 34 and confines the light to the width of a single waveguide throughout its entire path, with the exception of the short distance within each of the gaps 37–38. Thus, coupling loss at the waveguide intersection between waveguides 32 and 34 is reduced. FIG. 6 shows another application of this idea, which will be described in more detail below.

As can be seen from FIG. 4, the width of each of the gaps 37–38 is small, compared to the width of each of the waveguides 32 and 34. This causes the divergence loss associated with the gaps 37–38 to be negligibly small.

In one embodiment, the gaps 37 and 38 are part of the substrate 40. In another embodiment, the gaps 37–38 are not part of the substrate 40. Instead, the gaps 37–38 are formed by other dielectric material with a refractive index lower than the core refractive index of the waveguides 32 and 34 and the triangular waveguide region 33. Again, the difference between the core refractive index of the waveguides 32–34 and the refractive index of the gaps 37–38 determines the critical angle of light at the interface of the waveguides 32–34 and the gaps 37–38. The greater the difference, the larger the critical angle.

FIG. 6 shows another application of the segmented waveguide concept. As can be seen from FIG. 6, two waveguides 61 and 62 of a planar optical device 60 intersect to form a waveguide crossover region (the shaded region) 63. The waveguides 61–62, and waveguide crossover region 63 have the same core refractive index. The waveguides 61–62 are embedded in a substrate (not shown in FIG. 6) having a cladding refractive index lower than the core refractive index. The waveguide 61 is separated from the waveguide crossover region 63 by two gaps 64 and 65. Likewise, the waveguide 62 is separated from the waveguide crossover region 63 by two gaps 66 and 67. This means that the waveguide crossover region 63 is confined by the gaps 64–67 into a waveguide that is optically coupled to (1) an input waveguide portion 61a and an output waveguide portion 61b of the waveguide 61 and (2) an input waveguide portion 62a and an output waveguide portion 62b of the waveguide 62. The gaps 64–67 have a refractive index lower than the core refractive index of the waveguides 61–63. In one embodiment, the gaps 64–67 are part of the substrate. In another embodiment, the gaps 64–67 are not part of the substrate.

Figure 7:
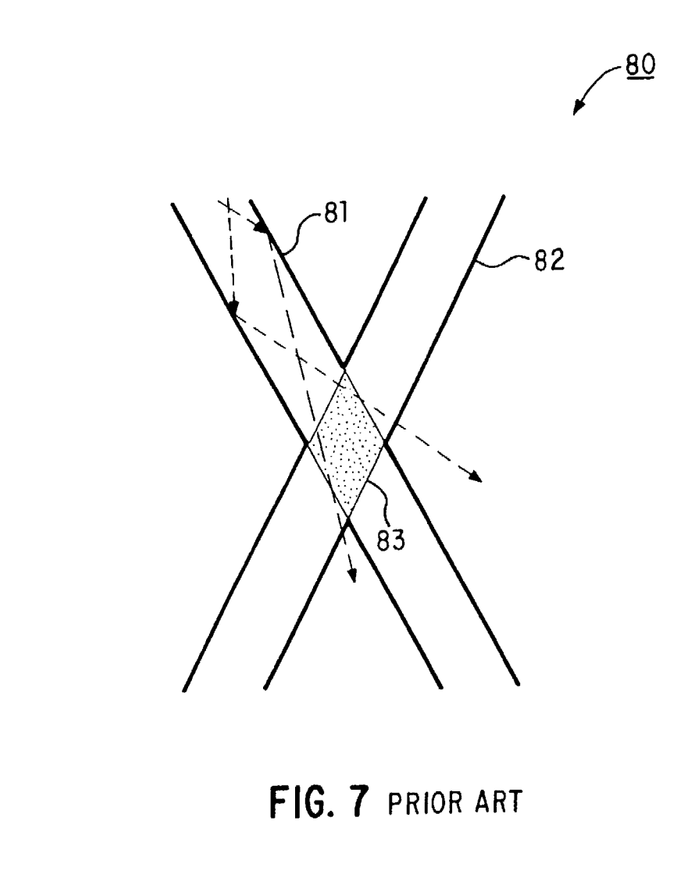
FIG. 7 shows a similar planar waveguide device implemented in accordance with prior art.

As can be seen from FIG. 6, light rays (e.g., rays 68 and 69) in the input waveguide portion 61a of the waveguide 61 are captured in the output waveguide portion 61b of the waveguide 61 due to the confined waveguide crossover region 63, thus reducing light loss. These light rays would otherwise have been lost in a prior art intersecting waveguide structure 80 having a non-confined waveguide crossover region 83 as shown in FIG. 7. Because the gaps 64–67 in FIG. 6 confine the crossover waveguide region 63 into a short waveguide, light rays 68–69 traveling through the waveguide crossover region 63 do not enter the other waveguide 62 at above the critical angle. This results in the light rays 68–69 being captured by the output waveguide portion 61b.

FIG. 8 shows the geometrical pattern of the input waveguide 48 of FIG. 3 in accordance with one embodiment of the present invention. As can be seen from FIG. 8, the input waveguide 48 has an input width $W_{IN}$ at its light input end and an output width $W_{OUT}$ at its light output end, wherein $W_{OUT}$ is greater than $W_{IN}$. In one embodiment, the width of the input waveguide 48 is linearly increased from $W_{IN}$ to $W_{OUT}$ such that the input waveguide 48 has a tapered shape. In another embodiment, the width of the input waveguide 48 is increased from $W_{IN}$ to $W_{OUT}$ to form a tapered shape in a nonlinear fashion.

Figure 9:
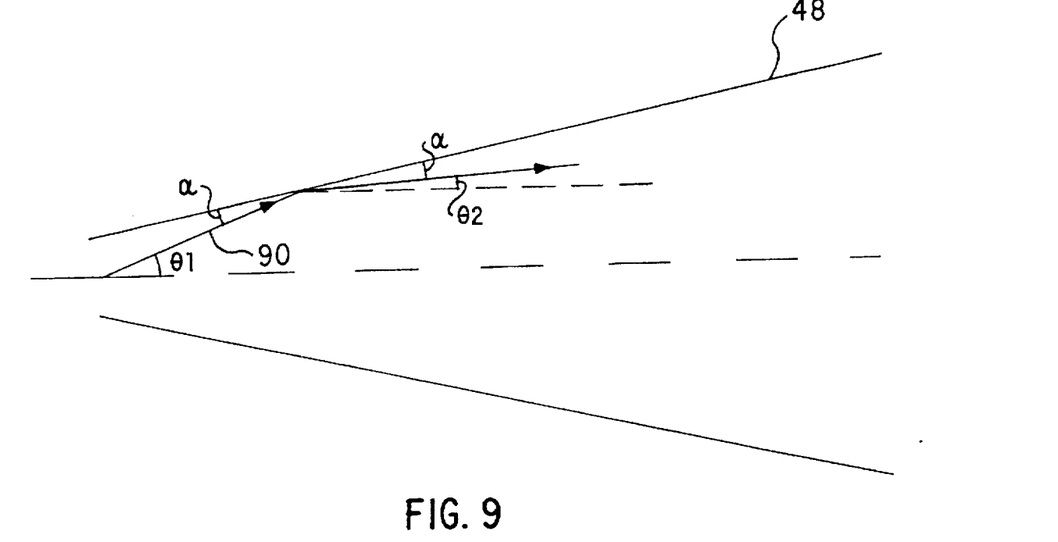
FIG. 9 illustrates the angular spread reduction of light by the tapered input waveguide of FIG. 8.
Figure 10:
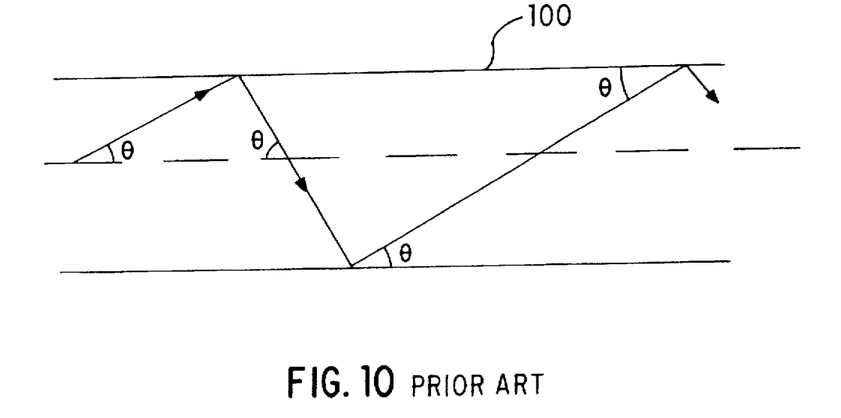
FIG. 10 illustrates no angular spread reduction of light by a prior art non-tapered input waveguide.

The tapered input waveguide 48 reduces angular spread of light rays exiting the input waveguide 48. FIG. 9 illustrates such effect of the tapered input waveguide 48. As can be seen from FIG. 9, when an incident ray 90, with angle $\theta_1$ with respect to the optical axis impinges upon the core-cladding interface of tapered input waveguide 48, the reflected ray 91 has a smaller angle $\theta_2$ with respect to the optical axis. In this way, light exiting tapered waveguide 48 has a smaller divergence than light entering tapered waveguide 48. This results in less optical loss throughout the zigzag demultiplexer. In addition, the smaller divergence results in improved performance of optical filters 45a–45d. As a comparison, FIG. 10 shows no angle reduction by a non-tapered waveguide 100. The concept of the tapered waveguide 48 can also be applied to the waveguides of the zigzag waveguide structure 31. For example, the waveguide 32 of FIG. 3 can also have a tapered shape like that of the waveguide 48 of FIG. 8.

Figure 12:
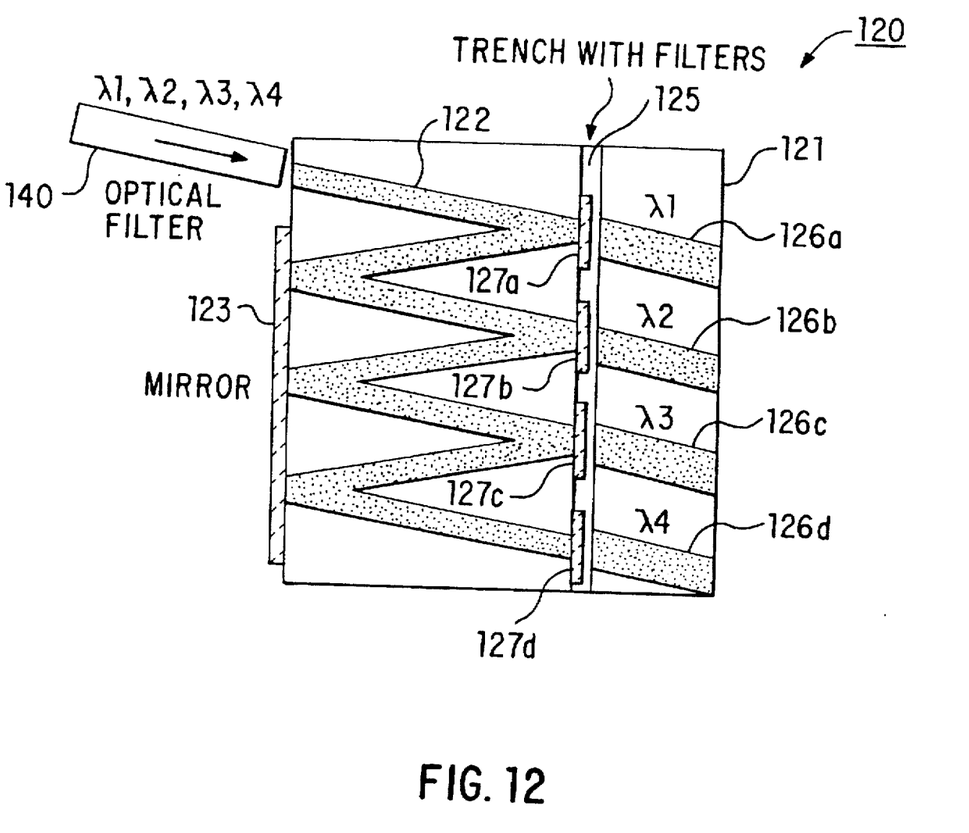
FIG. 12 is a top view of another optical waveguide demultiplexer in accordance with another embodiment of the present invention.

FIG. 12 shows another demultiplexer 120 having a trench 125 formed in a substrate 121 for holding optical filters 127a through 127d in accordance with another embodiment of the present invention. FIG. 12 is a top view of the demultiplexer 120. As can be seen from FIG. 12, the trench 125 is formed in the substrate 121 between the embedded zigzag waveguide structure 122 and a number of embedded output waveguides 126a through 126d. Output waveguides 126a through 126d have a width higher than the zigzag waveguides 122a through 122g. This reduces the optical loss resulting from divergence of the light in the trench. The trench 125 can be formed by a dicing saw or, as a further example, by etching or excimer laser ablation.

Figure 13:
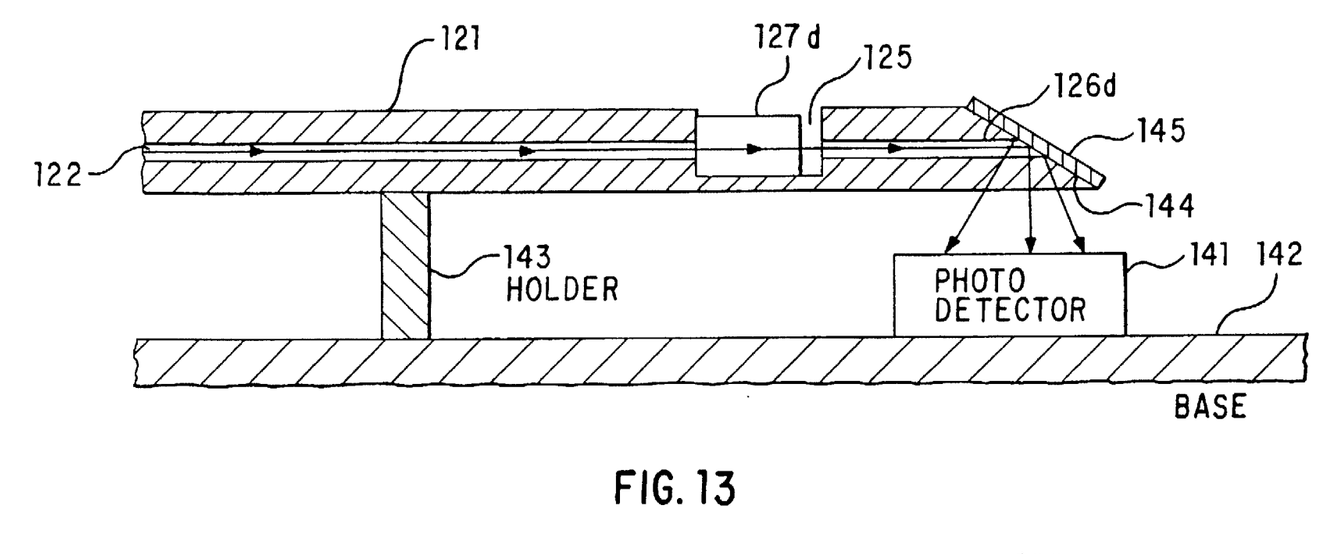
FIG. 13 is a side view of the optical waveguide demultiplexer of FIG. 12.

FIG. 13 shows that the output waveguides 126a–126d and the substrate 121 are terminated at an angle to form an angled interface 144 such that light exiting the output waveguides 126a–126d can be reflected to a plane perpendicular to that of the waveguides 126a–126d in accordance with one embodiment of the present invention. FIG. 13 shows a side view of the demultiplexer 120. A reflective layer 145 is applied onto the angled interface 144 to reflect the light from the waveguides 126a–126d. Alternatively, reflective layer 145 can be omitted, and light from the waveguides 126a–126d can be reflected by angled interface 144 through the phenomenon of total internal reflection. This angled interface 144 allows the demultiplexer 120 to be optically directly coupled to photo detectors (e.g., the photo detector 141) located beneath the demultiplexer 120. This is convenient when it is desirable to package the demultiplexer 120 in a plane parallel to the surface of a detector (e.g., the detector 141).

In one embodiment, the angled interface 144 is of approximately 45°. Alternatively, the angled interface 144 may be of other angles.

In one embodiment, the angled waveguide interface 144 is formed using a dicing saw. Alternatively, the angled waveguide interface 144 can be formed using other known means.

Figure 14:
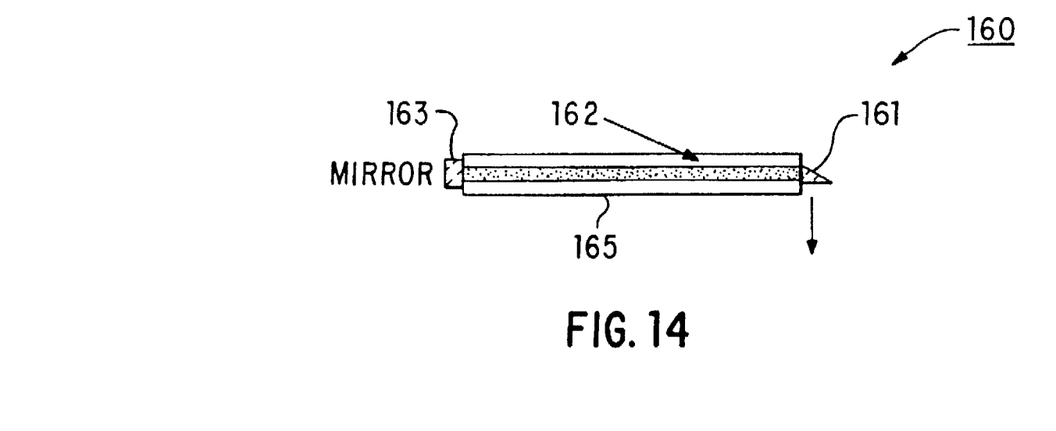
FIGS. 14 and 15 show other direct coupling of an optical demultiplexer to an external photo detector in accordance with other embodiments of the present invention.
Figure 15:
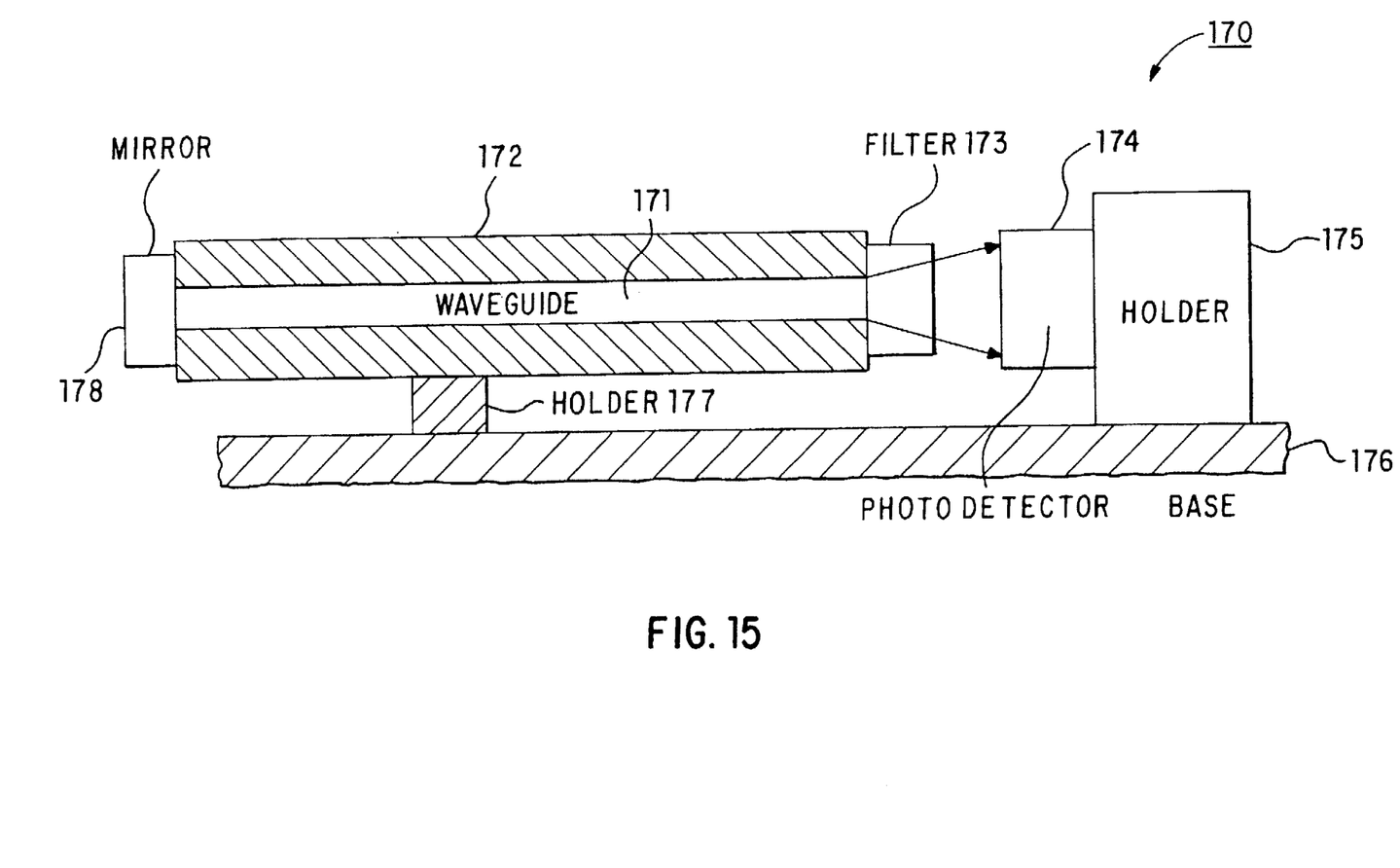

FIGS. 14 and 15 show different direct coupling schemes from an optical waveguide device to an external photo detector. As can be seen from FIG. 14, the optical device 160 has an angled optical filter 161 coupled to the waveguide 162 of the device 160. The waveguide 162 is embedded in a substrate 165. The angled optical filter 161 reflects the light from the waveguide 162 to a different plane. FIG. 15 shows another direct coupling scheme for an optical waveguide device 170.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A reflectively coupled optical waveguide structure, comprising:

(A) at least a first and a second optical waveguide;

(B) at least one overlapping waveguide region that allows reflective coupling from the first waveguide to the second waveguide, wherein the reflective coupling in the overlapping waveguide regions is provided by an optical filter such that light with certain wavelengths is reflectively coupled into the second waveguide while light with certain other wavelengths is not reflected and passes through the optical filter, wherein the waveguides and the overlapping waveguide region have the same refractive index;

(C) a first gap region between the overlapping waveguide region and the first waveguide and a second gap region between the overlapping waveguide region and the second waveguide, wherein the first and second gap regions have a refractive index lower than that of the waveguides and the overlapping waveguide region so as to minimize divergence loss of light due to the overlapping waveguide region.

2. The optical waveguide structure of claim 1, further comprising an output waveguide to collect light passing through the optical filter, wherein the output waveguide has a width larger than the first waveguide.

3. The optical waveguide structure of claim 1, further comprising a reflective surface in an angled position with respect to the optical filter such that light passing through the optical filter is deflected by the reflective layer at a direction not in the plane of the waveguides.

4. The optical waveguide structure of claim 1, wherein the light passing through the optical filter is directly incident onto a photodetector without any intervening optical fiber.

5. The optical waveguide structure of claim 1, where the refractive index of the gap regions is the same as that of a cladding region of the waveguides.

6. The optical waveguide structure of claim 1, wherein the first and second waveguides and the overlapping waveguide region are fabricated in a polymer material.

7. The optical waveguide structure of claim 1, wherein the first optical waveguide has a width which varies from a smaller value at an optical input end to a larger value at an optical output end to reduce the divergence angle of the light at the optical output end.

8. A reflectively coupled optical waveguide structure, comprising:

(A) at least a first and a second optical waveguide;

(B) at least one overlapping waveguide region that allows reflective coupling from the first waveguide to the second waveguide, wherein the reflective coupling in the overlapping waveguide regions is provided by a mirror, wherein the waveguides and the overlapping waveguide region have the same refractive index;

(C) a first gap region between the overlapping waveguide region and the first waveguide and a second gap region between the overlapping waveguide region and the second waveguide, wherein the first and second gap regions have a refractive index lower than that of the waveguides and the overlapping waveguide region so as to minimize divergence loss of light due to the overlapping waveguide region.

9. The optical waveguide structure of claim 8, wherein the mirror is a partially reflective mirror.

10. The optical waveguide structure of claim 9, further comprising an output waveguide to collect light passing through the optical filter, wherein the output waveguide has a width larger than the first waveguide.

11. The optical waveguide structure of claim 10, further comprising a reflective surface in an angled position with respect to the mirror such that light passing through the optical filter is deflected by the reflective layer at a direction not in the plane of the waveguides.

12. The optical waveguide structure of claim 9, wherein the light passing through the partially reflective mirror is directly incident onto a photodetector without any intervening optical fiber.

13. The optical waveguide structure of claim 8, where the refractive index of the gap regions is the same as that of a cladding region of the waveguides.

14. The optical waveguide structure of claim 8, wherein the first and second waveguides and the overlapping waveguide region are fabricated in a polymer material.

15. The optical waveguide structure of claim 8, wherein the first optical waveguide has a width which varies from a smaller value at an optical input end to a larger value at an optical output end to reduce the divergence angle of the light at the optical output end.

16. A planar optical waveguide device, comprising:
(A) a first waveguide;
(B) a second waveguide, intersecting the first waveguide to form a crossover waveguide region, wherein the first and second waveguides and the crossover waveguide region have a first refractive index;
(C) a number of gap regions having a second refractive index lower than the first refractive index, wherein each of the gap regions is located between a respective one of the first and second waveguides and the crossover waveguide region to minimize divergence loss of light due to the crossover waveguide region, wherein the crossover waveguide region is an integral region and is not divided by any of the gap regions into a number of regions.

17. The planar optical device of claim 16, where the refractive index of the gap regions is the same as that of a cladding region of the first and second waveguides.

18. The optical waveguide device of claim 16, wherein the first and second waveguides and the overlapping waveguide region are fabricated in a polymer material.

* * * * *